United States Patent [19]

Michielsen et al.

[11] Patent Number: 5,734,411
[45] Date of Patent: Mar. 31, 1998

[54] METHOD FOR MAKING AN IMAGE BY DIRECT THERMAL IMAGING

[75] Inventors: Joseph Michielsen, Edegem; David Tilemans, Lier, both of Belgium

[73] Assignee: AGFA-Gevaert, Mortsel, Belgium

[21] Appl. No.: 336,311

[22] Filed: Nov. 8, 1994

[30] Foreign Application Priority Data

Nov. 22, 1993 [EP] European Pat. Off. ............ 93203263

[51] Int. Cl.$^6$ ...................................................... B41J 2/38
[52] U.S. Cl. .............................................................. 347/186
[58] Field of Search ............................ 347/185, 186, 347/211, 191; 358/486

[56] References Cited

U.S. PATENT DOCUMENTS

| 4,327,381 | 4/1982 | Amicel | 358/486 |
| 4,675,695 | 6/1987 | Samuel | 347/211 |
| 5,087,923 | 2/1992 | Bruch | 347/191 |

FOREIGN PATENT DOCUMENTS

| 9164160 | 9/1984 | Japan | 347/186 |
| 2386 | 1/1985 | Japan | 347/186 |

*Primary Examiner*—Benjamin R. Fullen
*Assistant Examiner*—L. Anderson
*Attorney, Agent, or Firm*—Richard J. Birch

[57] ABSTRACT

A method for making an image by means of a direct thermal imaging element, comprising on a support a thermosensitive layer incorporating an organic silver salt and a reducing agent contained in said thermosensitive layer and/or in other optional layers. The imaging element is imagewise heated by means of a thermal head having energizable heating elements. The activation of the heating elements is executed duty cycled pulsewise with the steps of preheating each heating element for a preheating time such that a preheat temperature in the imaging element is reached, which is just below the conversion temperature; selecting a pulse duty cycle such that a maximal density on the imaging element will be reached at the end of the maximal writing time; retrieving from a memory for each individual pixel an individual writing time related to a desired density on the imaging element; and energizing the heating elements with the selected pulse duty cycle for a time related to the retrieved individual writing time.

10 Claims, 12 Drawing Sheets

| 240 | 0 | 240 | 0 | 240 | 0 | 240 | 0 | 240 | 0 | 240 | 0 | 240 | 0 | 240 | 0 |
|---|---|---|---|---|---|---|---|---|---|---|---|---|---|---|---|
| 55 | 120 | 55 | 120 | 55 | 120 | 55 | 120 | 55 | 120 | 55 | 120 | 55 | 120 | 55 | 120 |
| 55 | 120 | 55 | 120 | 55 | 120 | 55 | 120 | 55 | 120 | 55 | 120 | 55 | 120 | 55 | 120 |
| 55 | 120 | 55 | 120 | 55 | 120 | 55 | 120 | 55 | 120 | 55 | 120 | 55 | 120 | 55 | 120 |
| 55 | 120 | 55 | 120 | 55 | 120 | 55 | 120 | 55 | 120 | 55 | 120 | 55 | 120 | 55 | 120 |
| 55 | 120 | 55 | 120 | 55 | 120 | 55 | 120 | 55 | 120 | 55 | 120 | 55 | 120 | 55 | 120 |
| 55 | 120 | 55 | 120 | 55 | 120 | 55 | 120 | 55 | 120 | 55 | 120 | 55 | 120 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |
| 19 | 41 | 19 | 41 | 19 | 41 | 19 | 41 | 19 | 41 | 19 | 41 | 19 | 41 | 19 | 41 |

METHOD FOR MAKING AN IMAGE BY DIRECT THERMAL IMAGING

DESCRIPTION

1. Field of the Invention

The present invention relates to a recording method for direct thermal imaging.

2. Background of the Invention

Thermal imaging or thermography is a recording process wherein images are generated by the use of imagewise modulated thermal energy. Thermography is concerned with materials which are not photosensitive, but are sensitive to heat or thermosensitive and wherein imagewise applied heat is sufficient to bring about a visible change in a thermosensitive imaging material, by a chemical or a physical process which changes the optical density.

Most of the direct thermographic recording materials are of the chemical type. On heating to a certain conversion temperature, an irreversible chemical reaction takes place and a coloured image is produced.

In direct thermal printing, said heating of the recording material may originate from the image signals which are converted to electric pulses and then through a driver circuit selectively transferred to a thermal printhead. The thermal head consists of microscopic heat resistor elements, which convert the electrical energy into heat via the Joule effect. The electric pulses thus converted into thermal signals manifest themselves as heat transferred to the surface of the thermosensitive imaging material wherein the chemical reaction resulting in colour development takes place. This principle is described in "Handbook of Imaging Materials" (edited by Arthur S. Diamond—Diamond Research Corporation—Ventura, Calif., printed by Marcel Dekker, Inc. 270 Madison Avenue, New York, ed 1991, p. 498–499).

A particular interesting direct thermal imaging element uses an organic silver salt in combination with a reducing agent. Such combination may be imaged by a suitable heat source such as e.g. a thermal head, a laser etc. A black and white image can be obtained with such a material because under the influence of heat the silver ions are developed to metallic silver.

However, when imaged with a thermal head it appears to be difficult to obtain a neutral black tone image. For this purpose it has been suggested to add toning agents, but these still do not yield satisfactory results. Furthermore, it appears to be difficult to obtain a desired number of grey levels which may be required for some application, in particular if the image is to be used for medical diagnostic purposes.

OBJECTS OF THE INVENTION

Accordingly it is an object of the present invention to provide an improved recording method for making an image using a direct thermal imaging element, comprising on a support a thermosensitive layer containing a substantially light insensitive organic silver salt that is imagewise heated by means of a thermal head having energizable heating elements, which method yields improved tone neutrality in the printed images.

Further objects and advantages will become apparent from the description given hereinbelow.

SUMMARY OF THE INVENTION

We now have found that the above mentioned objects can be achieved by providing a method for making an image by imagewise heating by means of a thermal head having energizable heating elements ($H_i$) a direct thermal imaging element (m), comprising on a support a thermosensitive layer incorporating an organic silver salt and a reducing agent contained in said thermosensitive layer and/or in (an) other optional layer(s), wherein the activation of the heating elements is executed duty cycled pulsewise and comprises the steps of:

preheating each heating element for a preheating time ($t_o$) such that a preheat temperature ($T_O$) in the imaging element is reached, which is below the conversion temperature ($T_c$) of the imaging element (m) within a range of $$T_c - 3 \leq T_o < T_c$$

(all temperatures being expressed in degrees centigrade °C.);

selecting a pulse duty cycle, called gradient pulse duty cycle ($\delta_g$), so that a set maximal density ($D_{max}$) on the imaging element (m) will be reached within a writing time ($t_w$) between 90% of the maximal writing time ($t_{w,max}$) and 100% of the maximal writing time;

retrieving pro individual pixel from a memory (LUT-t) an individual writing time ($t_{w,i}$) related to a desired density ($D_n$) on the imaging element; and energizing the heating elements with the selected gradient pulse duty cycle ($\delta_g$) for a time related to the retrieved individual writing time ($t_{w,i}$).

Further preferred embodiments are set forth in the detailed description given hereinafter.

DETAILED DESCRIPTION OF THE INVENTION

The invention will be described with reference to the accompanying drawings, without the intention to limit the invention hereto, in which.

Figure 1:
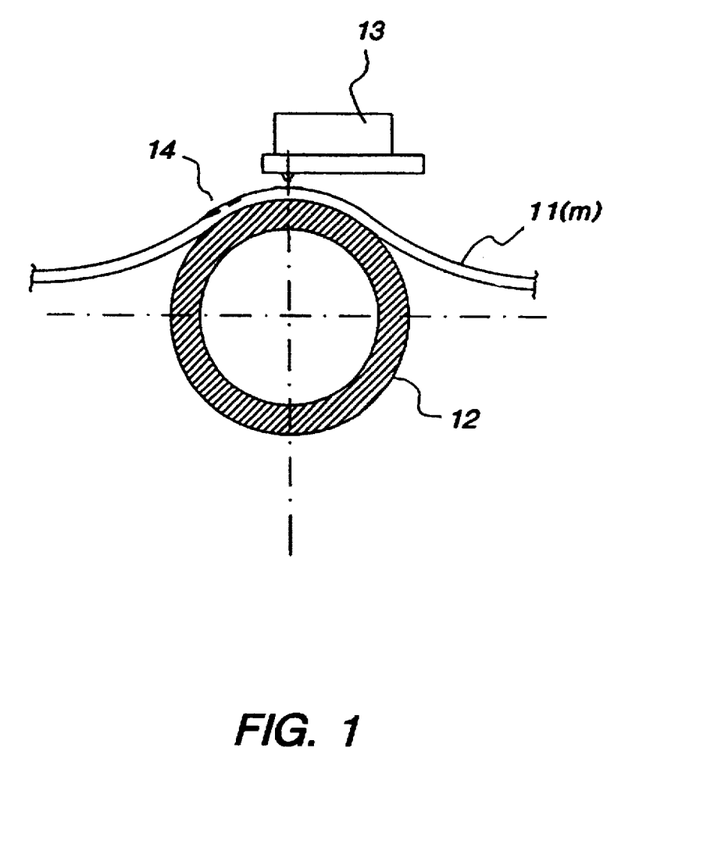
FIG. 1 is a schematic cross-sectional view of a direct thermal printer.

Referring to FIG. 1, there is shown a global principle scheme of a thermal printing apparatus that can be used in accordance with the present invention and which is capable to print a line of pixels at a time on a recording material 11, comprising on a support a thermosensitive layer containing an organic silver salt, which generally is in the form of a sheet. The recording material 11 is secured to a rotatable drum 12, driven by a drive mechanism (not shown) which continuously advances the drum 12 and the recording sheet 11 past a stationary thermal head 13. This head 13 presses the recording material 11 against the drum 12 and receives the output of the driver circuits. The thermal head 13 normally includes a plurality of heating elements equal in number to the number of pixels in the image data present in a line memory. The imagewise heating of the heating element is performed on a line by line basis, with the heating resistors geometrically juxtaposed each along another. The "line" may be horizontal or vertical depending on the configuration of the printer. Each of these resistors is capable of being energized by heating pulses, the energy of which is controlled in accordance with the required density of the corresponding picture element. As the image input data have a higher value, the output energy increases and so the optical density of the hardcopy image 14 on the recording sheet 11. On the contrary, lower density image data cause the heating energy to be decreased, giving a lighter picture 14.

Figure 2:
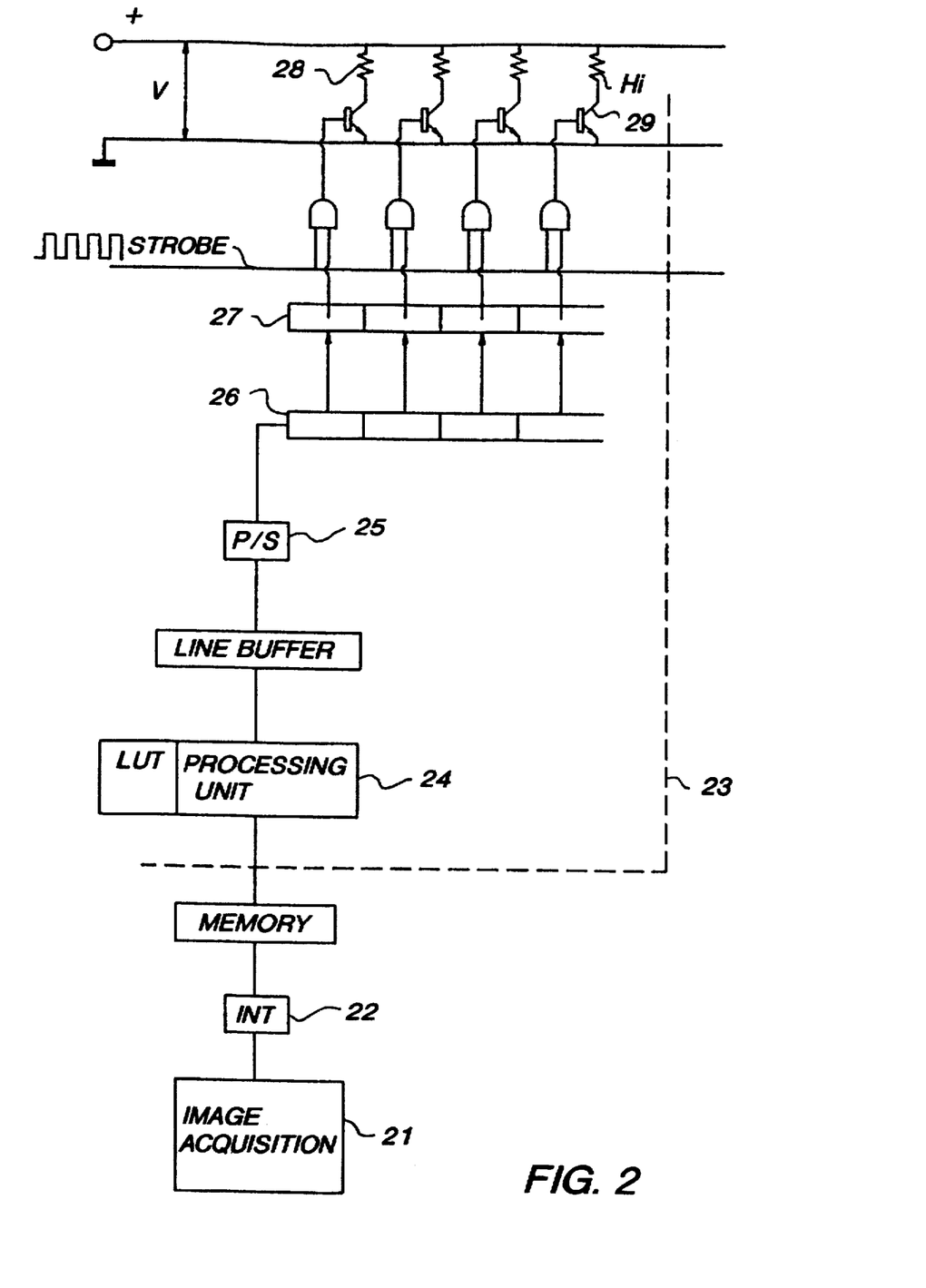
FIG. 2 is a data flowchart of a direct thermal printer.

The different processing steps are illustrated in the diagram of FIG. 2. First a digital signal representation is obtained in an image acquisition apparatus 21. Then, the digital image signal is applied via a digital interface 22 and a first storing means (indicated as "MEMORY" in FIG. 2) to a recording unit or printer 23. In the recording unit 23 the digital image signals may first be processed 24, which includes a data conversion e.g. for relating the optical densities to the input data (cf. FIG. 6 to be described later on). Next the recording head (13 in FIG. 1) is controlled so as to produce in each pixel the density value corresponding with the processed digital image signal value 24. After processing 24 and parallel to serial conversion 25 of the digital image signals, a stream of serial data bits is shifted into another storing means, e.g. a shift register 26, representing the next line of data that is to be printed. Thereafter, under controlled conditions, these bits are supplied in parallel to the associated inputs of a latch register 27. Once the bits of data from the shift register 26 are stored in the latch register 27, another line of bits can be sequentially clocked into said shift register 26. As to the heating elements 28, the upper terminals are connected to a positive voltage source (indicated as V in FIG. 2), while the lower terminals of the elements are respectively connected to the collectors of the driver transistors 29, whose emitters are grounded. These transistors 29 are selectively turned on by a high state signal (indicated as "STROBE" in FIG. 2) applied to their bases and allow current to flow through their associated heating elements 28. In this way a direct thermal hardcopy (14 in FIG. 1) of the electrical image data is recorded. By varying the heat applied by each heating element 28, a variable density image pixel is formed by the recording material 11.

Figure 3:
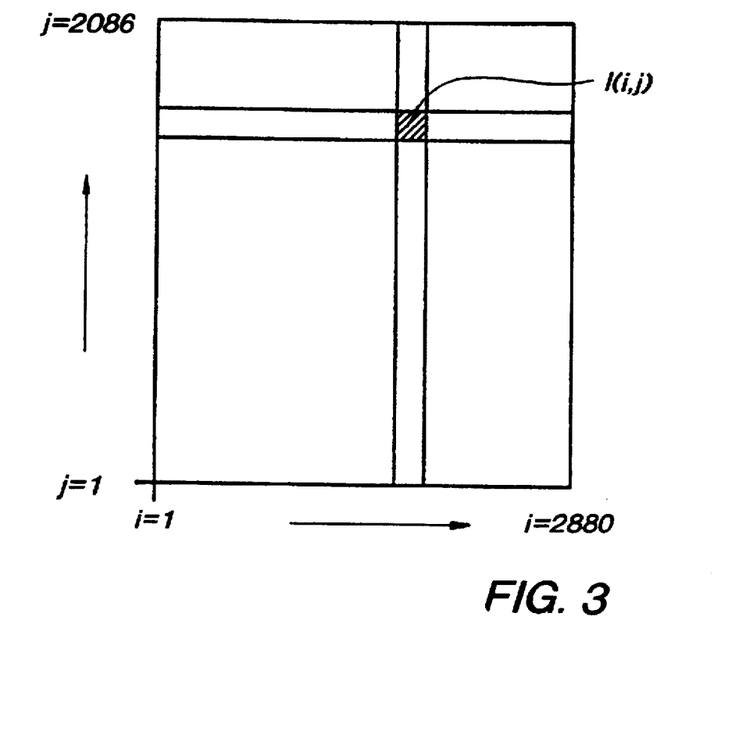
FIG. 3 is an image signal matrix representing quantized density values or image data.

Because the processing unit 24 is very important for the further disclosure of the present invention, special attention is now focused on it. As already mentioned before, the electrical image data are available at the input of 24. Said data are generally provided as binary pixel values, which are in proportion to the densities of the corresponding pixels in the original image. For a good understanding of said proportion, it is noted that an image signal matrix (see FIG. 3) is a twodimensional array of quantized density values or image data I(i,j) where i represents the pixel column location and j represents the pixel row location, or otherwise with i denoting the position across the thermal head of the particular heating element and j denoting the line of the image to be printed. For example, an image with a 2880×2086 matrix will have 2880 columns and 2086 rows, thus 2880 pixels horizontally and 2086 pixels vertically. The output from said matrix is a string of pulses related to the density to be printed in each pixel, whereby the number of density values of each pixel to be reproduced is restricted by the number of bits pro pixel. For a K bit deep image matrix, individual pixels can have $N=2^k$ density values, ranging from 0 to $2^k-1$. If the matrix depth or pixel depth is 8 bits, the image can have up to $2^8$ or 256 density values.

More in particular, the image signal matrix to be printed is preferably directed to an electronic lookup table (indicated as LUT in 24) which correlates the quantized density values to the power dissipated during the strobe pulses to be used to drive each heating element 28 in the thermal printhead 13. Further, the activating pulses may be adapted by correlating each of the strings of pulses to density controlling methods, as will be described further on in the present application. The corrected pulses are then directed to the head driver 29 for energized the thermal heating elements 28 within the thermal head 13.

Figure 4:
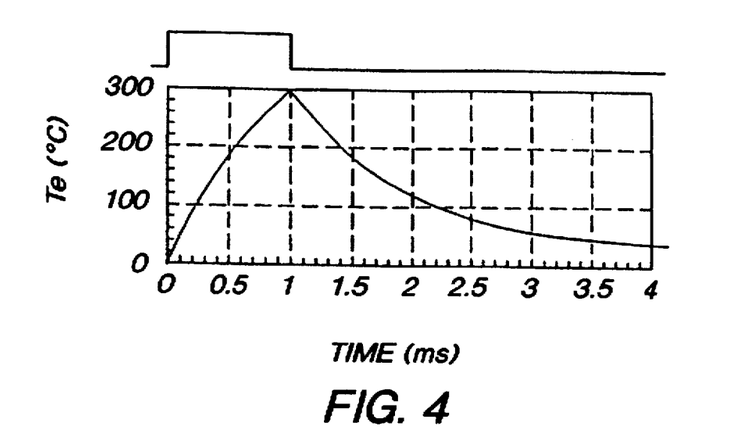
FIG. 4 is a graph of the heating and cooling curve of a heating element.

The effect of feeding one activation pulse to a resistive heating element 28 is illustrated in FIG. 4, showing the temperature on the vertical axis and the time on the horizontal axis. During said activation pulse the temperature of the resistive heating element, indicated as $T_e$, rises from e.g. 20° C. to 300° C., rising steeply at first and then more gradually. After the activation has been switched off, the resistive heating element cools down.

Figure 7:
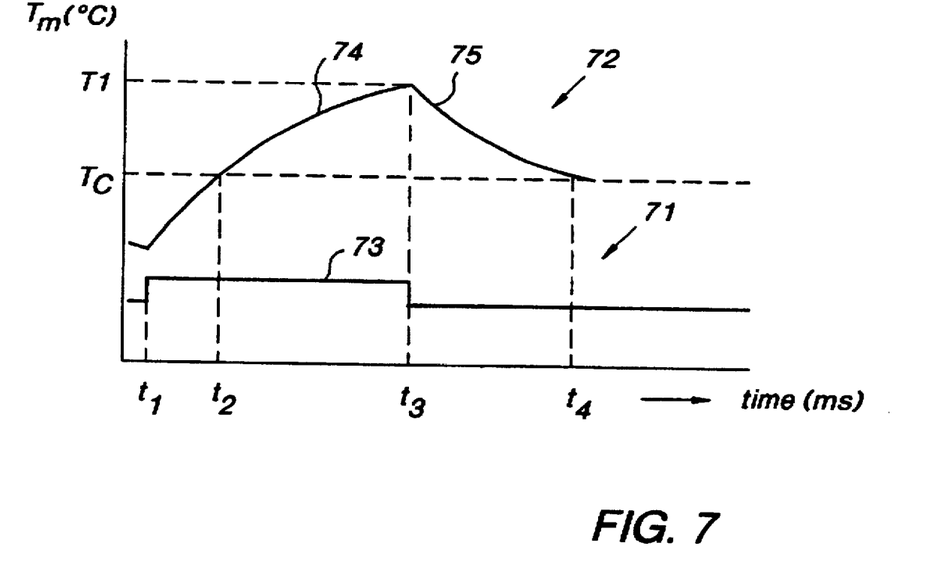
FIG. 7 is a graph showing a strobe signal and the temperature of an imaging element according to a prior art.

From said FIG. 4, it may be easily seen that the temperature $T_e$ of the heating elements, and hence also the resulting density in the printed image 14, may be influenced by controlling the activating pulses to the heating elements of the thermal head. These heating elements may be activated in various ways. For example, the desired density at a particular image pixel may be obtained by varying the pulse width supplied to a particular heating element. Such an activation is illustrated in FIG. 7 by a curve 71 which represents the strobe signal that is input to each driver 29 (see FIG. 2). Curve 72 illustrates the temperature of the imaging element m in response to a strobe signal, assuming that the image data signal is present for the corresponding driver. The strobe signal comprises a single pulse 73 that begins at time $t_1$ and ends at time $t_3$. During time interval from $t_1$ to $t_3$, the temperature of the imaging element rises exponentionally, as illustrated by curve portion 74. After time $t_3$, the temperature of the imaging element decreases exponentionally, as indicated by curve portion 75. After a time $t_2$ the imaging element temperature $T_m$ reaches the so-called "conversion temperature $T_c$", which is defined as being the minimum temperature of the thermosensitive imaging material m necessary during a certain time range to cause reaction between the organic silver salt and reducing agent so as to form visually perceptable metallic silver. In FIG. 7 the imaging element temperature $T_m$ is above the conversion temperature from time $t_2$ to $t_4$; thus between $t_2$ to $t_4$ density is built up. The maximum obtainable density within $t_2$ to $t_4$ of course will be limited by the constitution of the thermosensitive imaging material m.

As a result of this pulse width activation the imaging element temperature rises substantially above the conversion temperature (symbolically $T_m >> T_c$) and a good tone neutrality is difficult to obtain.

Figure 6:
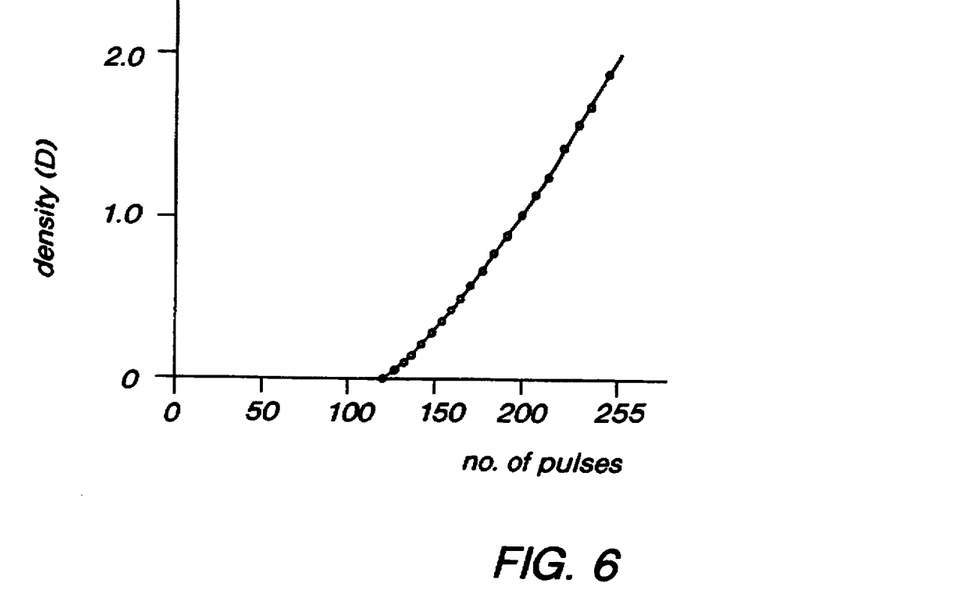
FIG. 6 is a graph showing the relationship between the number of drive pulses applied to a heating element and the recording density on the imaging element.

For a better understanding of the conversion temperature $T_c$, we refer to FIG. 6, which illustrates a relationship between the number of activation pulses to be applied to a heating element ($H_i$) and the density of an image 14 recorded by said heating element on a thermosensitive imaging material m. As shown, up to approximately 120 drive pulses, the heating elements only become heated and do not produce enough heat to record a density and, thus, the recording density remains zero. If more than 120 activation pulses are applied, the heating elements start to produce enough heat to carry out recording, which begins at the conversion temperature $T_c$. As the number of drive pulses increases further, the recording density increases nonlinearly. A thermosensitive imaging material in connection with the present invention generally will have a $T_c$ between 75° and 120° C.

We now have found that the problem of obtaining a variable density image pixel in the recording material 11, without substantial coloring as e.g. a browning of the print, can be solved by executing the activation of the heating elements according to the next method which comprises four steps preheating each heating element for a preheating time ($t_o$) such that a preheat temperature ($T_0$) in the imaging element is reached, which is below the conversion temperature ($T_c$) of the imaging element (m) within a range of $$T_c - 3 \leq T_0 < T_c$$

(all temperatures being expressed in degrees centigrade °C.);

selecting a pulse duty cycle, called gradient pulse duty cycle ($\delta_g$), so that a set maximal density ($D_{max}$) on the imaging element (m) will be reached within a writing time ($t_w$) between 90% of the maximal writing time ($t_{w,max}$) and 100% of the maximal writing time;

retrieving pro individual pixel from a memory (LUT-t) an individual writing time ($t_{w,i}$) related to a desired density ($D_n$) on the imaging element; and energizing the heating elements with the selected gradient pulse duty cycle ($\delta_g$) for a time related to the retrieved individual writing time ($t_{w,i}$).

Figure 11:
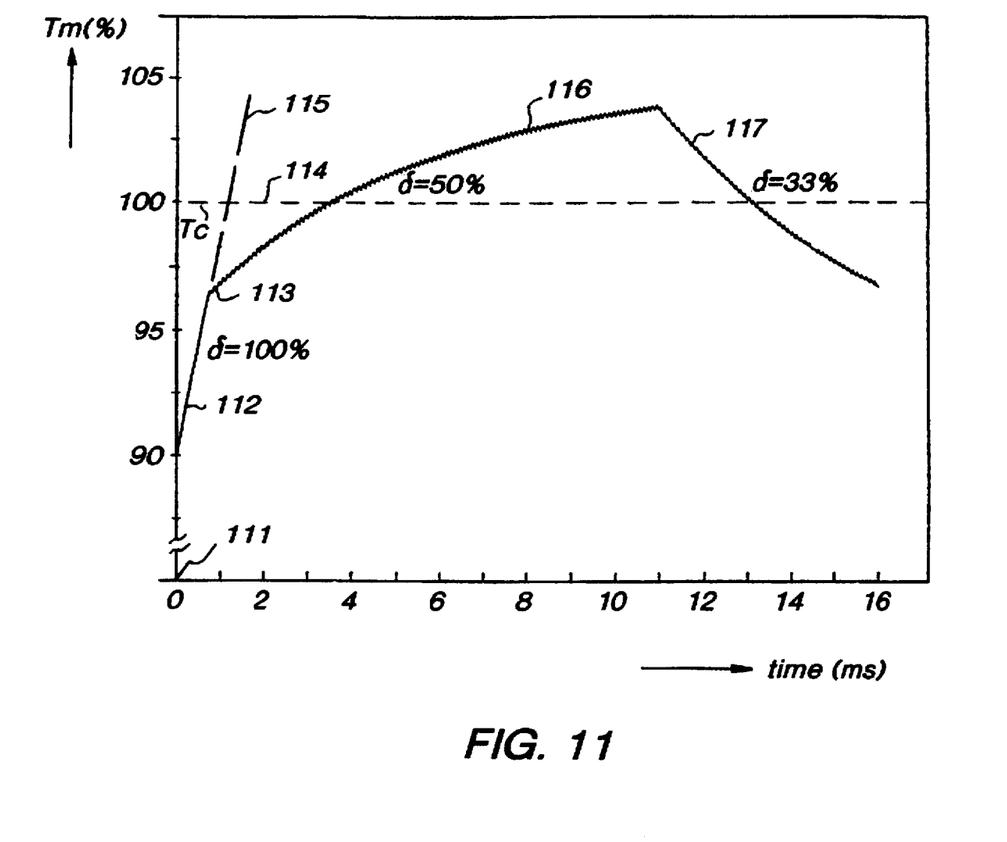
FIG. 11 is a graph of the heating and the cooling curve of a heating element, resulting from all heating pulses corresponding to one line-time including duty cycle pulsewise activation according to the present invention.
Figure 12:
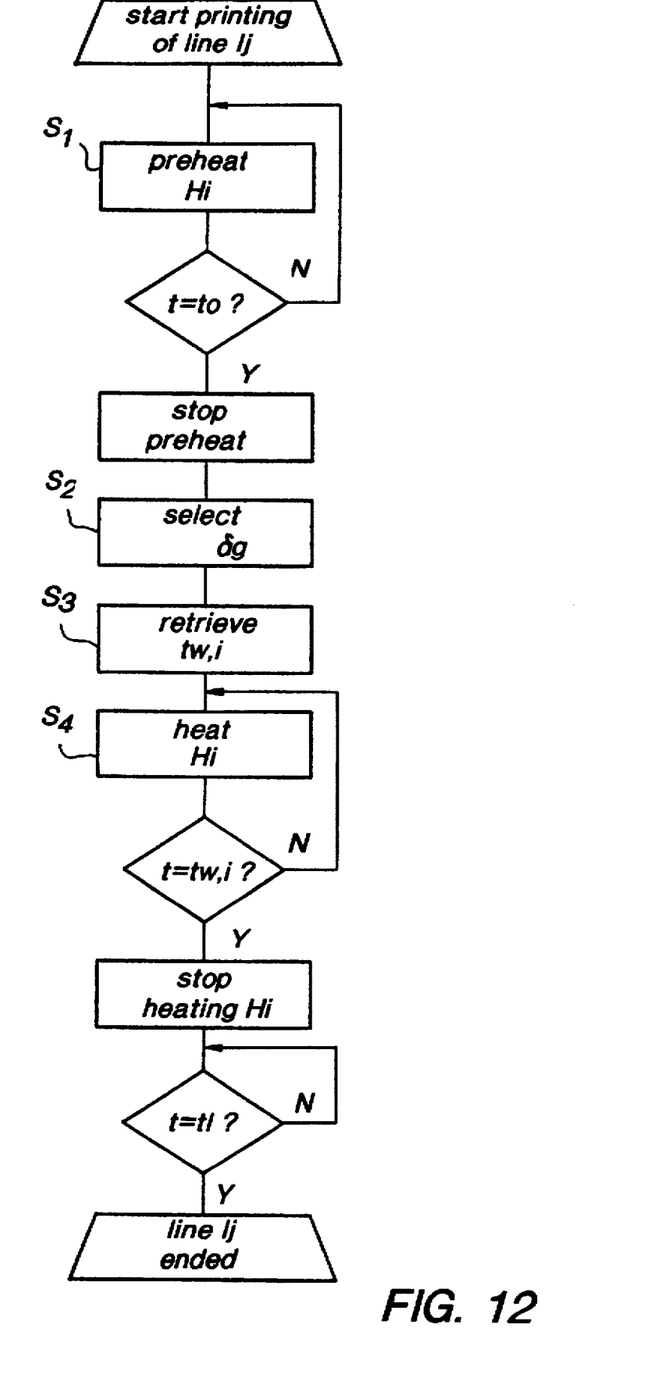
FIG. 12 is a flowchart of the basic method according to the present invention.

Now all essential steps of the present invention will be explained in full detail. Reference will be made to FIG. 11, which is a graph of the heating and the cooling curve of a heating element, resulting from all heating pulses corresponding to one line-time including duty cycle pulsewise activation according to the present invention. In this FIG. 11, the abscissa is showing a time duration of the activation (in ms), and the ordinate is showing the temperature $T_m$ of the imaging element (expressed in relative percentages %). Reference is also made to FIG. 12, which is a flowchart of the basic method according to the present invention and wherein all consecutive steps of the present invention are schematically illustrated.

In reference to the just mentioned first step, immediately after having received a print command and regardless of the absence or presence of dots to be printed, electrical energy is provided at a high average rate so that the preheating should bring the imaging element (m) as soon as possible to a desired preheating temperature $T_0$, which preferably is just below $T_c$, more specifically within a range $$T_c - 3 \leq T_0 < T_c \qquad [1]$$

(all temperatures being expressed in degrees centigrade °C.). This preferred method of preheating is clearly illustrated in the left part of FIG. 11, wherein the preheating starts from a temperature 111 via a steepest ascent preheating 112 to attain a preheating temperature 113 below the conversion temperature 114 after a preheating tme of e.g. $t_0=1$ ms.

Figure 8:
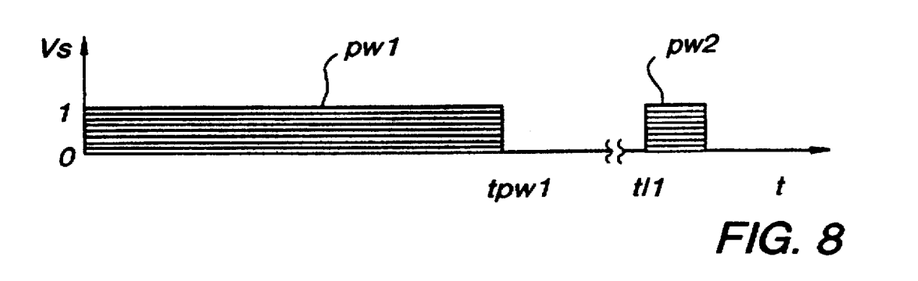
FIG. 8 is a chart illustrating principally the strobe pulses of a heating element in the case of pulse width activation.
Figure 9:
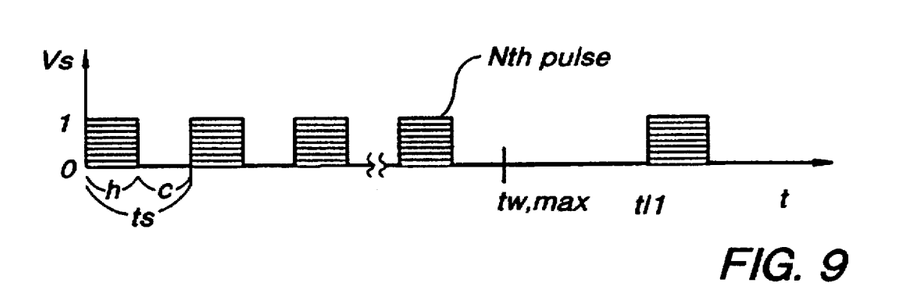
FIG. 9 is a chart illustrating principally the strobe pulses of a heating element in the case of duty cycle activation.

Although the preheating may be executed continuously or discontinuously (commonly called pulsewise), in a preferred embodiment of the present invention, during the preheating time ($t_0$) duty cycled pulsewise activation is preferred with a high duty cycle, and more preferably with $\delta_0 = 100\%$. The basic principles of duty cycled pulsewise activation will be explained in reference to FIGS. 8 and 9. FIG. 8 is a chart illustrating principally the strobe pulses of a heating element in the case of pulse width activation according to a prior art; whereas FIG. 9 is a chart illustrating principally the strobe pulses of a heating element in the case of duty cycle activation according to the present invention. The repetition strobe period ($t_r$) consists of one heating cycle (h) and one cooling cycle (c) as indicated in FIG. 9. The strobe pulse width (h) is the time an enable strobe signal (ref STROBE in FIG. 2) is on. The "strobe duty cycle $\delta$" of a heating element is the ratio of the heating or strobe pulse width (h) to the repetition strobe period ($t_r=h+c$). So, formula [2] applies $$\delta = h/(h+c) \qquad [2]$$

As the applied power directly relates to the temperature attained in the thermal head, and as this temperature relates to the optical density attained in the image material, special attention is paid now to the control of the applied power.

In the case of duty cycle activation, the applied time averaged power may be calculated from $$P = \delta \times V^2 / R \qquad [3]$$

wherein V is the amplitude of the voltage applied to the thermal head (in Volt), R is the electrical resistance of a heating element (in $\Omega$).

It will be clear from the above formulae [2 and 3] that the time averaged power density P may be adjusted by changing the strobe duty cycle $\delta$, or P may be adapted by changing the voltage V. Each of these parameters may be changed during printing or may be optimized for a particular type of image.

According to a preferred embodiment of the present invention, in the case of duty cycle activation, the active strobe pulses begin from the start of the line time ($t_1$), as illustrated in FIG. 9, at least if any activation is present, which clearly results from at least a minimal density (ref. FIG. 6).

Figure 10:
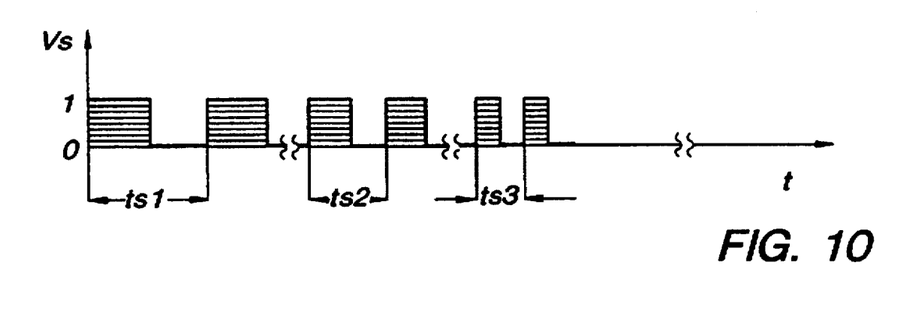
FIG. 10 is is a chart illustrating principally the activating strobe pulses of a heating element with a decreasing strobe period and constant strobe duty cycle.

According to the present invention, adaptable duty cycle pulsing (ADC) may be carried out in several ways, a general survey of which is given now. In a printer in connection with the present invention, the strobe period ($t_r=h+c$) may be a constant (cf. FIG. 9) or may be changed, e.g. by software programming, during the activation time (cf. FIG. 10). In one embodiment of a printer in connection with the present invention, the duty cycle preferably is a constant, but the strobe period ($t_s=h+c$) may be changed (FIG. 10, wherein e.g. $t_{s1} > t_{s2} > t_{s3}$). *In still another embodiment of a printer in connection with the present invention, neither the strobe period (h+c), nor the strobe duty cycle ($\delta$) are constant, and both may be varied during activation (see FIG. 5, to be discussed later on).*

As already formulated before, step 2 comprises a selecting of a pulse duty cycle ($\delta_g$) such that a set maximal density ($D_{max}$) on the imaging element (m) will be reached at the end of the maximal writing time ($t_{w,max}$), more specifically within a range of 0.9 $t_{w,max}$ to 1.0 $t_{w,max}$. Said set maximal density ($D_{max}$) on the imaging element (m) may be defined by the characteristics of the imaging system. Using this second step implicates that the further heating, called gradient heating, to be executed in the later step 4, will be preferably as slow as possible, that in the imaging material m the temperature to time gradient will be preferably as slow as possible, and per consequence the $D_{max}$ will be attained preferably as slow and as late as possible (not before 0.9 $t_{w,max}$ and not after $t_{w,max}$). In practice, it is found that this method brings a remarkable improvement in tone neutrality of the printed image 14. As illustrated in the above mentioned FIG. 11, after the preheating time $t_0$, the further gradient heating will not follow a maximal heating rate 115, but instead a slower heating rate as indicated by the curve portion 116.

Figure 13:
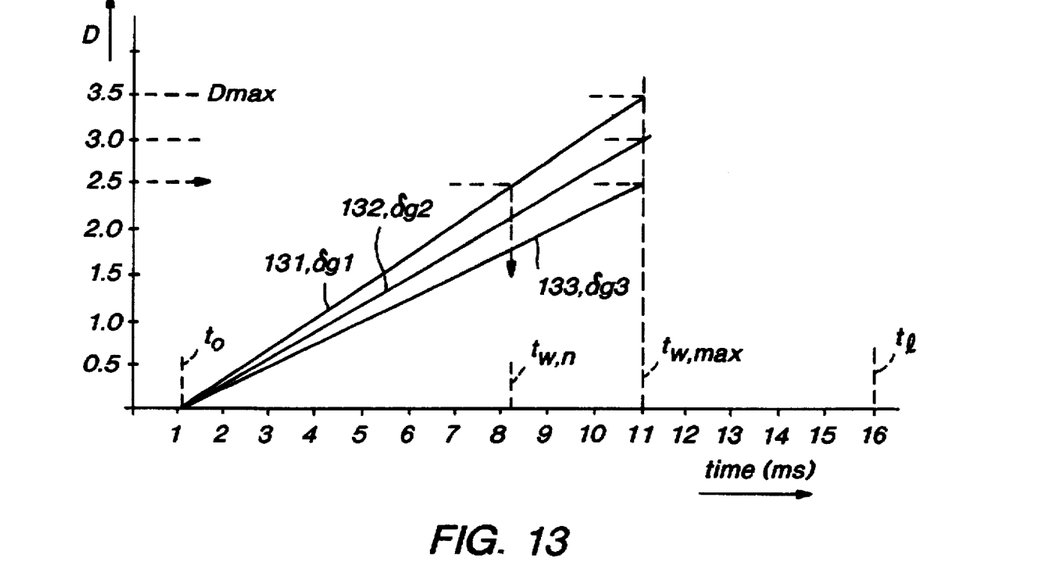
FIG. 13 is a graph showing a time evolution of the recording density on an imaging element.

As already formulated before, step 3 comprises retrieving pro individual pixel from a memory (LUT-t) an individual writing time ($t_{w,i}$) related to a desired density ($D_i$) on the imaging element. In order to explain this step 3 of the disclosed method more clearly, reference is made to FIG. 13 and to Table 1 and to FIG. 5. FIG. 13 is a graph showing a time evolution of the recording density on an imaging element m, wherein for sake of simplicity, small fluctuations originating from the intermediate cooling times c (cfr. FIG. 9) are not represented, resulting in a quasi linear time evolution. In said FIG. 13, one may see on curve 131 with an exemplary duty cycle $\delta_g = \delta_{g1}$, that a set maximal density $D_{max}=3.5$ is reached after gradient heating for 11 ms; whereas an intermediate density $D_n=2.5$ is reached after gradient heating for 8 ms.

Table 1 is a principal example of a LUT-t, indicating at the input or left side a number of desired densities $D_i = \{D_0, D_1, \ldots D_n, \ldots D_{max}\}$, and at the output or right side the corresponding writing times $t_{w,i} = \{t_{w,0} \ldots t_{w,n} \ldots t_{w,max}\}$ during which a heating element $H_i$ has to be activated in order to achieve the desired densities on the imaging element m.

TABLE 1

| LUT-t | |
|---|---|
| e.g. $t_1 = 16$ ms; $t_{w,max} = 11$ ms; $D_{max} = 3.5$ (cfr. curve 131 in FIG. 13) | |
| $D_i$ | $t_{w,i}$ [ms] |
| $D_0$ | $t_{w,0}$ |
| $D_1$ | $t_{w,1}$ |
| ... | ... |
| $D_n$ | $t_{w,n}$ |
| ... | ... |
| $D_{max}$ | $t_{w,max}$ |

Figure 5:
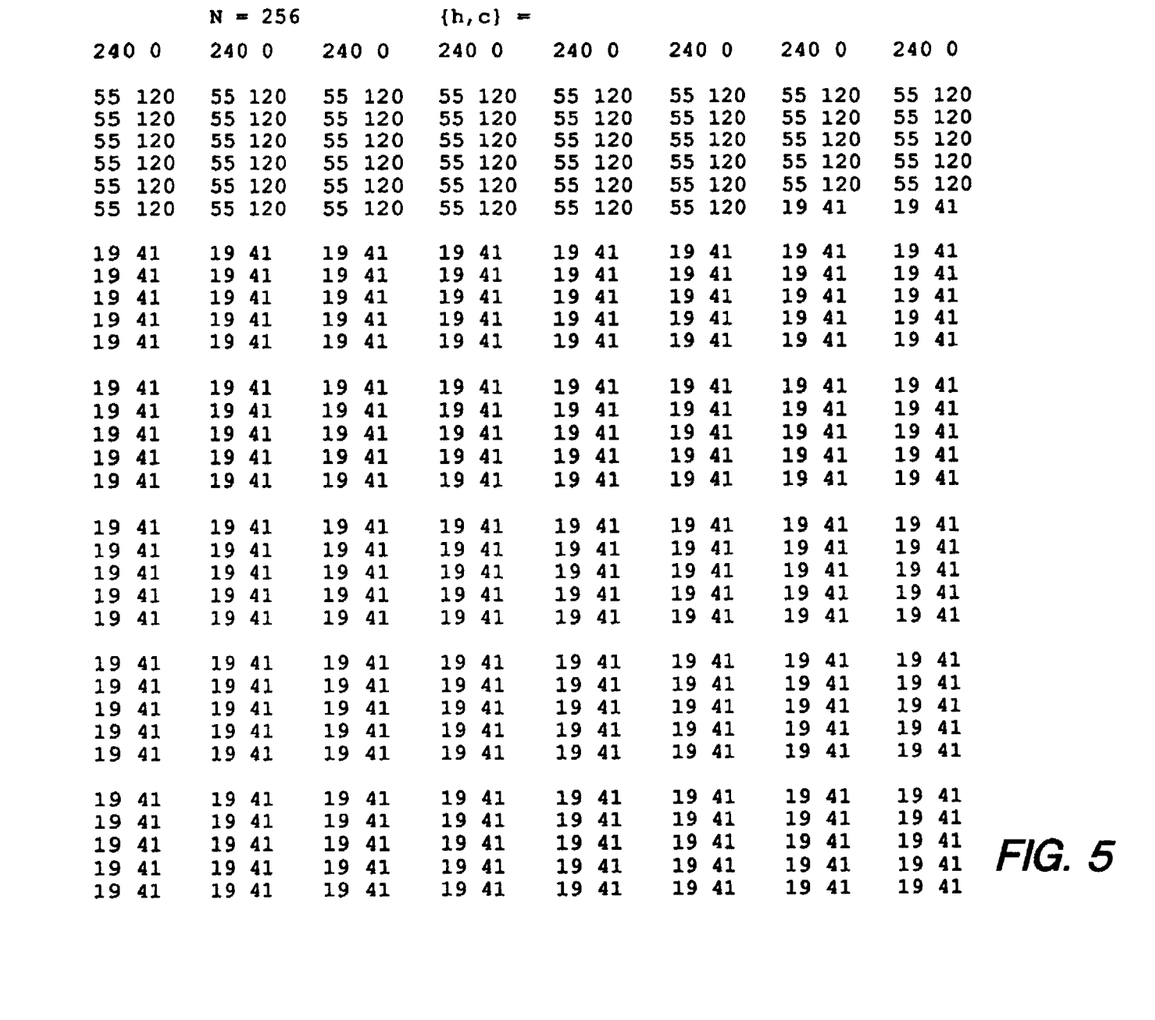
FIG. 5 is a practical LUT-t giving consecutive heating times and cooling times for maximal 256 density levels.

FIG. 5 gives a practical example of a LUT-t intended for maximal 256 density levels, as implemented in one of the preferred embodiments of the present invention, wherein the consecutive heating times h and cooling times c are now expressed in a number of pulses (instead of in absolute time units).

In FIG. 13, the curves 132 and 133 illustrate time evolutions of the recording density on an imaging element m with exemplary duty cycles $$\delta_g = \delta_{g2} \text{ and } \delta_g = \delta_{g3}.$$

As already formulated before, the gradient heating step 4 comprises energizing each heating element with the selected gradient pulse duty cycle ($\delta_g$) for a time related to the retrieved individual writing time ($t_{w,i}$). Some illustrative examples may now be described with reference to Table 1: all pixels on the imaging element m which are intended to print no density ($D=D_0$) will not be activated after the preheating time $t_0$; all pixels on the imaging element m which are intended to print an exemplary density $D=D_n$ will be activated after the preheating time $t_0$ during a corresponding writing time $t_{w,n}$; and so on, up to $D_{max}$ corresponding with $t_{w,max}$. Combining FIG. 13 and Table 1, a $D_n=2.5$ corresponds for $\delta_g = \delta_{g1}$ with $t_{w,n}=8$ ms.

As a global result from all described method steps, FIG. 11 gives a graph of the heating and the cooling curve of a heating element, resulting from all heating pulses corresponding to one line-time including duty cycle pulsewise activation according to the present invention. Herein are illustrated a start 111 of the linetime $t_1$, a preheating traject 112, a preheat temperature $T_0$ at referral 113, a conversion temperature $T_c$ at referral 114, a hypothetical maximal further heating 115, a gradient heating 116 with a gradient duty cycle $\delta_g$ and a rest heating 117 (which will be described further on).

According to the present invention, it is very advantageous to make the preheating duty cycle ($\delta_0$) maximal (e.g. $\delta_0=100\%$), and to make the gradient duty cycle ($\delta_g$) minimal (e.g. $\delta_g=22.5\%$).

In a further preferred embodiment of the present invention, the difference between the line time and the maximal writing time ($t_1-t_w$) attains at least the thermal time constant of the thermal head $\tau$, e.g. if $t_1=16$ msec and if $\tau=5$ msec, then $t_{w,max}=11$ msec. expressed otherwise, formula [4] applies as $$(t_1 - t_{w,max}) \geq \tau \qquad [4]$$

By this step, it is assured that the temperature of the thermal head, at the beginning of a next line to be printed, is at a reproducable level. As a remarkable advantage, the heat possibly accumulated in the thermal head by foregoing printing cycles, does not have any impact on the actual temperature and so complex temperature compensation controls are not needed.

However, in an alternative preferred embodiment of the present invention, the maximal writing time equals the line time, so that $$(t_1 - t_{w,max}) = 0 \qquad [5]$$

Herein, extra temperature compensation controls are needed, but the maximal writing time is maximized (up to $t_1$), so that the applied temperature to time gradient really becomes minimal, thereby further optimizing the tone neutrality.

In a further embodiment of the present invention, as soon as the printing apparatus 23 is electrically connected to a power supply, and prior to initiation of any printing, the thermal head 13 may be warmed up by a standby heating (with a standby duty cycle $\delta_s$) prior to receiving digital image signals such that a standby temperature (indicated by $T_s$) is reached which is less than 10 degrees Celsius below the above explained conversion temperature $$T_s > T_c - 10°  \quad [6]$$

More generally, $$T_c > T_0 \geq T_s > T_c - 10°$$

As a result, the thermal head 13 remains at a predetermined standby temperature so that when printing will commence in the future, only a slight temperature difference $(T_0-T_s)$ has to be bridged and consistent printing is achieved very quickly. Accordingly, in FIG. 11, the preheating traject 112 will be very short. This standby heatingprior to receiving digital image signals preferably may be executed duty cycle pulsewise, with a standby duty cycle $\delta_s$.

Figure 14:
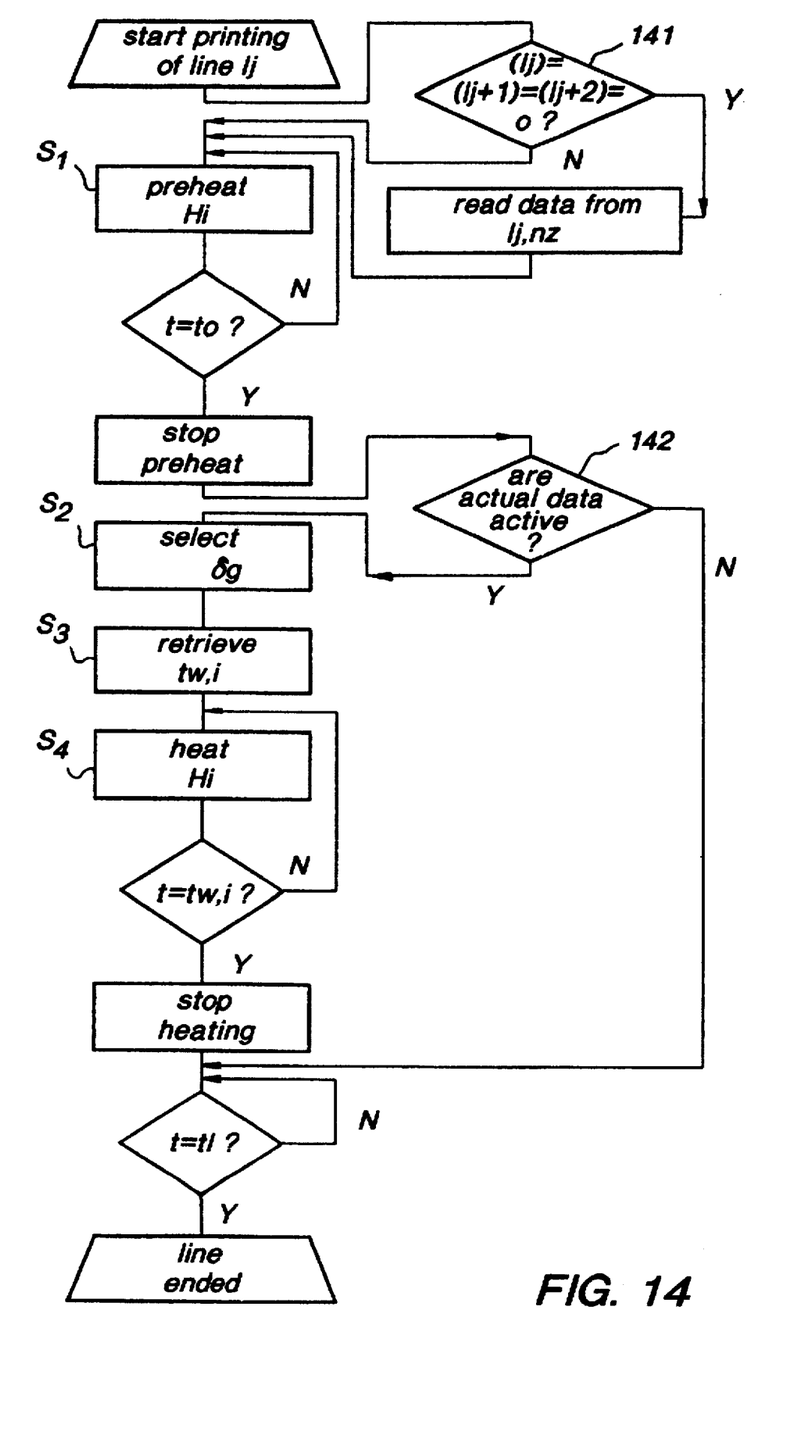
FIG. 14 is a flowchart of a more extended method according to the present invention.

In a still further embodiment of the present invention, after the just mentioned optional standby heating, the essential preheating step is preceded before the beginning of the preheating time by a checking step to see if at least three consecutive lines ($l_j$, $l_{j+1}$, $l_{j+2}$) are blank, in which case binary image data are captured from the first non zero line ($l_{j,nz}$). FIG. 14 is a flowchart of a more detailed method according to the present invention, the main parts being common to those of FIG. 12. The extra steps in FIG. 14 relate to a checking step 141 to see if at least three consecutive lines ($l_j$, $l_{j+1}$, $l_{j+2}$) are blank, in which case binary image data are captured from the first non zero line ($l_{j,nz}$), and to a checking 142 whether the actual data are still active, meaning that further gradient heating of the actual heating element ($H_i$) has to be continued.

In a still further embodiment of the present invention, for each non-printing heating element, thus representing a blanco dot, the described preheating step may be followed by ending further application of energy, allowing the heating element to cool. Alternatively, the preheating step may be followed by application of energy to each non-printing heating element at a reduced average rest-rate such that the imaging element m substantially remains at a desired rest temperature $T_r$, e.g. at the standby temperature $T_s$ or at the preheating temperature $T_0$.

In a still further embodiment of the present invention, the described gradient heating 115 may stop the activation of the heating elements $H_i$ if the actual pixel to be recorded does not require any further density, meaning that the desired density $D_i$ is already attained. Alternatively, the described gradient heating may be continued (see curve portion 117 in FIG. 11) at a reduced rest pulse duty cycle $\delta_r$ such that it remains at a desired rest temperature $T_r$.

In a preferred embodiment of the present invention, the method for making an image using a direct thermal imaging element, the image wise heating by adaptable duty cycle pulsing ADC is carried out line by line and the time for completing a line ($t_1$) may be optimised before making said image. Said optimization is restricted by the restraints of the available time for making the complete image, the number of lines within the image, the cooling time necessary between two consecutive lines and the required quality of the printed image, as it relates to the color and the number of densities. Generally, the line time will be in the order of milliseconds, e.g. between 10 and 50 ms, preferably between 15 and 35 ms.

In a further preferred embodiment of the present invention, the method for making an image using a direct thermal imaging element, the imagewise heating is carried out adaptable duty cycled pulsewise with a strobe period ($t_s=h+c$), which may be optimised before activation of the heating elements. Said strobe period is preferably as large as possible, taking into consideration the exact kind of thermosensitive material (m) and the exact kind of image. Said optimization is however restricted by the constraints of the available line time for making a complete line and the number of density levels desired. Supposing that the maximal number of obtainable density values attains N levels, the line time ($t_1$) is divided in a number (N) of strobe pulses each with repetition strobe periods $t_s$ as indicated on FIG. 9. In the case of e.g. 256 density values, according to a 8 bits format of the corresponding electrical image signal values, the maximal heating time would be reached after 256 sequential strobe periods. Generally, the strobe period will be in the order of microseconds, e.g. between 5 and 50 µs, preferably between 5 and 20 µs. Generally, the strobe duty cycle is between 20 and 100%.

In an alternative embodiment of the present invention, the activation may be optimized during the imagewise activation of the heating elements by changing the activation voltage amplitude (cf. formula 3). Generally, the activation voltage will be in the order of 15 Volt, e.g. between 10 and 20 V, preferably between 12 and 17 V.

Figure 15:
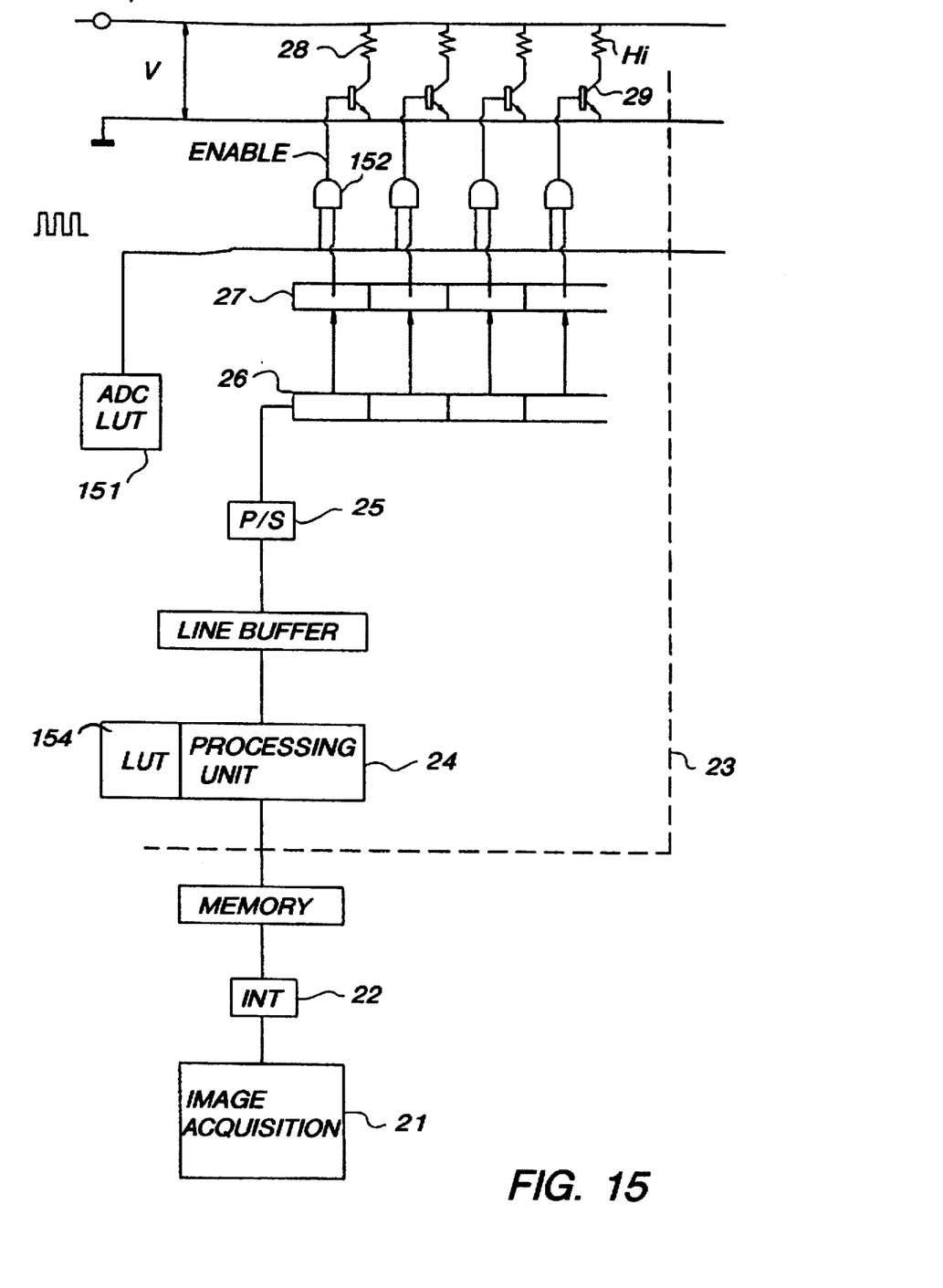
FIG. 15 is a preferred embodiment according to the present invention.

FIG. 15 illustrates in more detail a preferred embodiment of the control circuit by which the heating elements 28 are energized.

In FIG. 15, adjustable activating pulses are applied to a single heating element 29 to form an image pixel. During a line time, an individual heating element is addressed a predetermined number (kN) of times, N representing the number of maximum possible density levels and k being an integer equal to or greater than one ($k \geq 1$). In other words, there are N possible pulses in a line time cycle for each heating element (see also FIG. 9). Each time a heating element is addressed, only a single pulse can be applied to it. After all heating elements have been addressed once, the address process is repeated until the line time cycle is completed. At this time, a line of image pixels having a particular density will have been printed.

Before explaining the particularities of FIG. 15, we first emphasize that a relation of the activation power to the desired density levels may be implemented in the form of a lookup table, as it is in a preferred embodiment of the present invention. In a processing LUT (ref 154) each pixel value in the input image is mapped into the output image in such a way that each output pixel's value depends only on the value of the corresponding input pixel. In other words, instead of sending the digital image data (from 24) directly to the thermal head (ref 13 in FIG. 1), each pixel value will first be replaced by its corresponding LUT value. E.g. decimal code 0 (=binary code 00000000) gives the measured fog level; decimal code 255 (=binary code 11111111) gives a set maximal density $D_{max}$; all other values follow a curve in between them.

In a further preferred embodiment, the method of the disclosed invention, is further characterized in that, after the preheating period $t_0$, the further activation with duty cycle $\delta_g$ comprises the step of subjecting the image signals to a typical processing causing the processed signal values to be mapped onto corresponding density values, wherein said processing includes a non-uniform quantization which allocates a small optical gradient to the transfer curve in the low density region, a higher optical gradient to the transfer curve in the intermediate density region, and a still higher optical gradient to the transfer curve in the highest density region, such that the resulting densities on the hard-copy are spaced at equal perceived lightness with minimal perceptible contrast.

In another LUT 151 the width and the period of the strobepulses, and hence also the duty cycle may be stored, in relation to the different density levels (see also the former Tables 1 and the later Table 2). The output of said LUT 151 is fed to an AND gate 152, the output of which, indicated as ENABLE in FIG. 15, is high only if both inputs are high, thus enabling the transistors 29 to activate the heating resistors 28. The time during which the AND gate 153 is high clearly defines the activation time of the heating elements.

According to a further embodiment of the present invention, for each thermosensitive material m and for a specific kind of image (as e.g. a soft tissue of a human body versus a hard bone), a specific $D'_{max}$ may be selected, which may be lower than the ultimate maximal density $D_{max}$ of the printing system. This means that the set maximal density, already described before in relation to the second step of the present invention, may be equal to a largest density that needs to be reproduced from an image to be reproduced.

In the original embodiment, only a fraction of the total available writing time $t_{w,max}$ would be used, meaning that none of the heating elements $H_i$ would follow totally any entire heating curve (as illustrated by 131, 132 and 133 in FIG. 13). As a numerical example, if a recording system has e.g. a $D_{max}$=3.5, $t_{w,max}$=11 ms and a $\delta_g$=$\delta_{1g}$, then $D_{max}$=2.5 would be attained after about 8 ms (see curve 131 in FIG. 13) and further activation of $H_i$ would be abrupted.

In a modified embodiment intended for a specific kind of image and for a specific $D'_{max}$ being lower than the ultimate maximal density $D_{max}$ of the printing system, the writing time to achieve $D'_{max}$ may be enlarged up to nearly the maximal writing time $t_{w,max}$ in order to further slow down the thermal gradient and to still increase tone neutrality. In practice, this may be done by decreasing the duty cycle, which is illustrated in FIG. 16, showing an abrupted time evolution (ref. 161) and two non-abrupted time evolutions (refs. 162 and 163) of the recording density according to the present invention (with $\delta_{g1}$>$\delta_{g2}$>$\delta_{g3}$).

Figure 16:
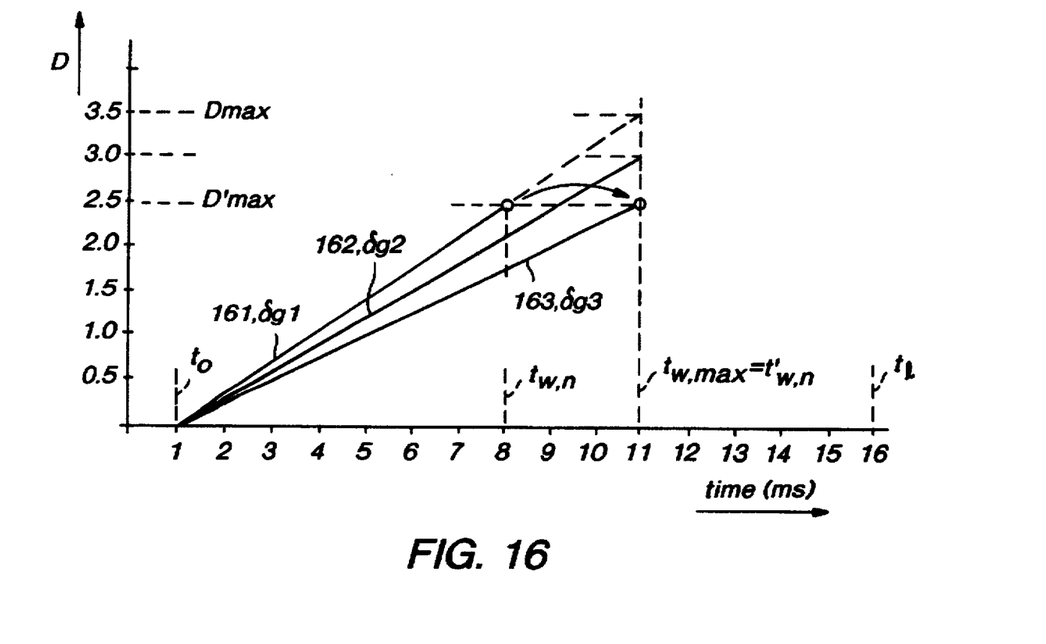
FIG. 16 is a graph showing, for an image specific $D'_{max}$ being lower than the system constrained $D_{max}$, an abrupted and a non-abrupted time evolution of the recording density according to the present invention.

As a numerical example of such a modified embodiment, if for a certain kind of an image $D'_{max}$=2.5, the corresponding $t_{w,max}$ could be enlarged from 8 ms (which is the ordinary case of Table 1) to $t'_{w,max}$=11 ms (see curve 163 in FIG. 16).

So, from a first table LUT-g a typical duty cycle $\delta$ may be selected, which is used as input into a second table LUT-t in order to relate individual writing times $t_{w,i}$ to individual intermediate densities $D_i$.

Reference is now made to Table 2 which is a principal example of such a LUT-g and a LUT-t relating to an image specific $D'_{max}$ being lower than the system constrained $D_{max}$.

TABLE 2

LTU-g: $t_1$ = 16 ms

| $D_{max}$ | $t_{w,max}$ | $\delta$ ]%] |
|---|---|---|
| $D_{max,min}$ | ... | ... |
| ... | | |
| $D_{max,n}$ = 2.5 | 8 | $\delta_{g,n}$ |
| ... | | |
| $D_{max,max}$ = 3.5 | 11 | ... |

LUT-t:
system constraints: $t_1$ = 16 ms; $t_{w,max}$ = 11 ms; $D_{max}$ = 2.5;
results from LUT-g: $\delta_g$ = $\delta_{g,n}$ [%]
new LUT:

| $D'_i$ | $t'_{w,i}$ [ms] |
|---|---|
| $D'_0$ | $t'_{w,0}$ |
| $D'_1$ | $t'_{w,1}$ |
| ... | ... |
| $D'_n$ | $t'_{w,n}$ |
| ... | ... |
| $D'_{max}$ = 2.5 | $t'_{w,max}$ = 11 |

Using the tables 1 or 2 or the table of FIG. 5, LUT 151 (FIG. 15) defines the printer so that a pixel value of zero corresponds with the minimum desired density value and the maximum pixel value (i.e. 255) corresponds with the maximum desired density, while all the pixel values in between correspond to a specified curve. After processing the electrical image signals with the aid of said LUT 151, according to the present invention, the required number and neutrality of the shades are effectively recorded.

With reference to FIG. 11, which is exagerated (in that $T_0$ is rather far below $T_c$ and in that $\delta_g$ is rather high) for reason of greater clarity, the preheating with $\delta_0$=100% could last for 1 ms in which time the imaging element should reach $T_0$. While gradient heating the conversion temperature of the imaging element $T_c$ could be crossed with a slow temperature to time gradient ($\delta_g$), but so that after $t_{w,max}$=11 ms a maximal temperature is reached, relative to $D_{max}$ on the imaging element. If the gradient would be higher, the maximal temperature and thus the maximal density $D_{max}$ would be reached earlier, thus long before the specified $t_w$=11 ms, but in this case a prohibitive coloring of the imaging element would be caused.

Figure 17:
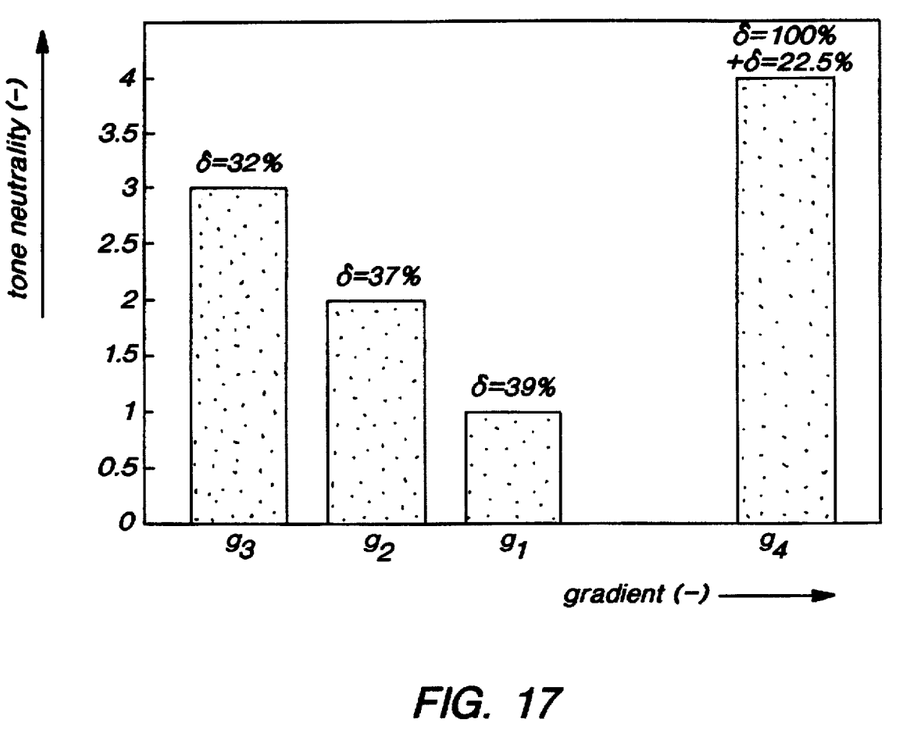
FIG. 17 is a graph showing experiments comparing tone neutrality as obtained by duty cycle pulsewise activation with different thermal gradients according to the present invention.

The present invention will be illustrated by the following experimental results, without however the intention to limit the invention hereto. FIG. 17 is a graph showing experiments comparing tone neutrality as obtained by duty cycle pulsewise activation with different thermal gradients (with $g_1$>$g_2$>$g_3$>$g_4$) according to the present invention. From these experiments it may be concluded that tone neutrality is rather poor (starting from 1 being bad) for duty cycle pulsewise activation with a high duty cycle ($\delta_{g1}$=39%), and that tone neutrality increases as the thermal gradient or corresponding duty cycle decreases (e.g. $\delta_{g2}$=37% and $\delta_{g3}$=32%). But, tone neutrality is best increased (up to 4) if a high gradient preheating (e.g. $\delta_0$=100%) and a slow gradient heating (e.g. $\delta_{g4}$=22.5%) are applied.

Of course, tone neutrality could also be expressed more mathematically by densitometric measuring several test samples of images provided by duty cycle pulsewise activation with different thermal gradients according to the present invention, wherein the densitometric measuring makes use of suitable filtres having different spectral characteristics.

In printheads for direct thermal imaging the surface temperature may reach 300°–400° C., while the recording sheet contacts the printheads at pressures of 200–500 g/cm².

Suitable thermal printing heads for use in direct thermal imaging are e.g. a Fujitsu Thermal Head FTP-040 MCS001, a TDK Thermal Head F415 HH7-1089, and a Rohm Thermal Head KE 2008-F3.

Although the invention has been described with respect to preferred embodiments, it is not to be so limited, as changes and modifications can be made within the intended scope of the present invention defined by the appended claims.

Direct thermal imaging can be used for both the production of transparencies and reflection type prints. In the hard copy field recording materials on white opaque base are used, whereas in the medical diagnostic field black imaged transparencies find wide application in inspection techniques operating with a light box.

The present invention clearly can also be applied in the case of colored images, in the case of which the electrical image signals corresponding to the different color selections are sequentially subjected to typical corresponding transformation lookup tables such that the diagnostic visual perception of the colored hardcopy reaches an optimum.

We claim:

1. A method for making an image by imagewise heating by means of a thermal head having energizable heating elements ($H_i$), a direct thermal imaging element (m), comprising on a support a thermosensitive layer incorporating an organic silver salt and a reducing agent contained in said thermosensitive layer and/or in another optional layer(s), wherein activation of the heating elements is executed duty cycled pulsewise and comprises the steps of:

preheating each heating element for a preheating time ($t_o$) such that a preheat temperature ($T_o$) in the imaging element is reached, which is below a conversion temperature ($T_c$) of the imaging element (m) within a range of $$T_c-3<T_o<T_c$$

selecting a pulse duty cycle ($\delta_g$), so that a set maximal density ($D_{max}$) on the imaging element (m) will be reached within a writing time ($t_w$) and 100% of a maximal writing time ($t_{w,max}$);

retrieving from a memory (LUT-t) an individual writing time ($t_{w,i}$) related to a desired density ($D_n$) on the imaging element for each individual pixel; and energizing the heating elements with a selected gradient pulse duty cycle ($\delta_g$) for a time related to the retrieved individual writing time ($t_{w,i}$).

2. The method according to claim 1, further comprising the step of defining the set maximal density ($D_{max}$) on the imaging element (m) by characteristics of an imaging system.

3. A method according to claim 1, further comprising the step of standby heating of the thermal head such that a standby temperature ($T_s$) is reached which is less than 10 degrees centigrade (°Celsius) below the "conversion temperature"

$$T_s > T_c - 10°.$$

4. A method according to claim 1, further comprising, before the step of preheating time ($t_o$), the step of checking whether at least three consecutive lines ($l_j$, $l_{j+1}$, $l_{j+2}$) are blank, in which case digital image signals are captured from a first non zero line ($l_{j,nz}$).

5. A method according to claim 1, further comprising, after the step of preheating time ($t_o$), the step of supplementary activating of each non-active heating element with a rest duty cycle ($\delta_r$) such that the imaging element m remains at a desired rest temperature.

6. A method according to claim 1, further comprising the step of selecting a duty cycle during preheating ($\delta_o$) that is maximal, and wherein both the gradient pulse duty cycle ($\delta_g$) and a rest duty cycle ($\delta_r$) are minimal.

7. A method according to claim 1, further comprising the step of attaining at least the thermal time constant of the thermal head τ during the difference between the line time and the maximal writing time such that $$(t_1-t_{w,max}) \geq \tau.$$

8. A method according to claim 1, further comprising the step of establishing that the maximal writing time equals the line time $$(t_1-t_{w,max})=0.$$

9. A method according to claim 1, further comprising the step of defining the set maximal density ($D_{max}$) on the imaging element (m) as an intermediate maximal density ($D'_{max}$) that is equal to a largest density that needs to be reproduced from an image being reproduced.

10. The method according to claim 1, further comprising, after the step of the writing time ($t_w$), the step of supplementary activating of each non-active heating element with a rest duty cycle ($\delta_r$) such that the imaging element m remains at a desired rest temperature.

* * * * *